No. 787,908. PATENTED APR. 25, 1905.
H. FORD.
AUTOMOBILE DRIVE GEAR.
APPLICATION FILED AUG. 1, 1904.

3 SHEETS—SHEET 1.

WITNESSES.
Lewis E. Flanders
Arthur T. Ceperley

INVENTOR.
Henry Ford
By Barthel & Barthel
Attorneys.

No. 787,908. PATENTED APR. 25, 1905.
H. FORD.
AUTOMOBILE DRIVE GEAR.
APPLICATION FILED AUG. 1, 1904.

3 SHEETS—SHEET 2.

WITNESSES.
Lewis E. Flanders
Arthur J. Ceperley

INVENTOR.
Henry Ford
By
Attorneys.

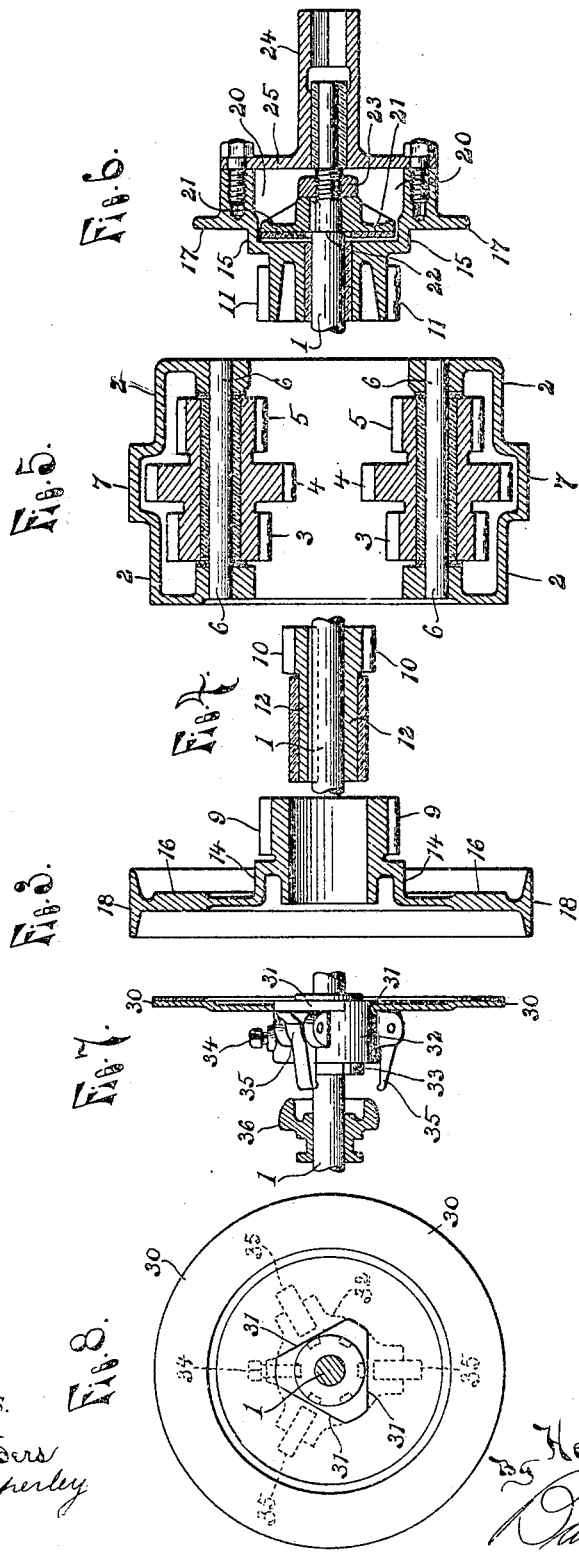

No. 787,908.

Patented April 25, 1905.

UNITED STATES PATENT OFFICE.

HENRY FORD, OF DETROIT, MICHIGAN.

AUTOMOBILE DRIVE-GEAR.

SPECIFICATION forming part of Letters Patent No. 787,908, dated April 25, 1905.

Application filed August 1, 1904. Serial No. 219,012.

*To all whom it may concern:*

Be it known that I, HENRY FORD, a citizen of the United States of America, residing at Detroit, in the county of Wayne and State of Michigan, have invented certain new and useful Improvements in Automobile Drive-Gear, of which the following is a specification, reference being had therein to the accompanying drawings.

This invention relates more specifically to improvements in automobile drive mechanism for the purpose of producing a change of speed or for reversing the motion; and the invention consists in the improved construction, arrangement, and operation of parts more fully hereinafter set forth, and shown in the accompanying drawings, in which—

Figure 1:
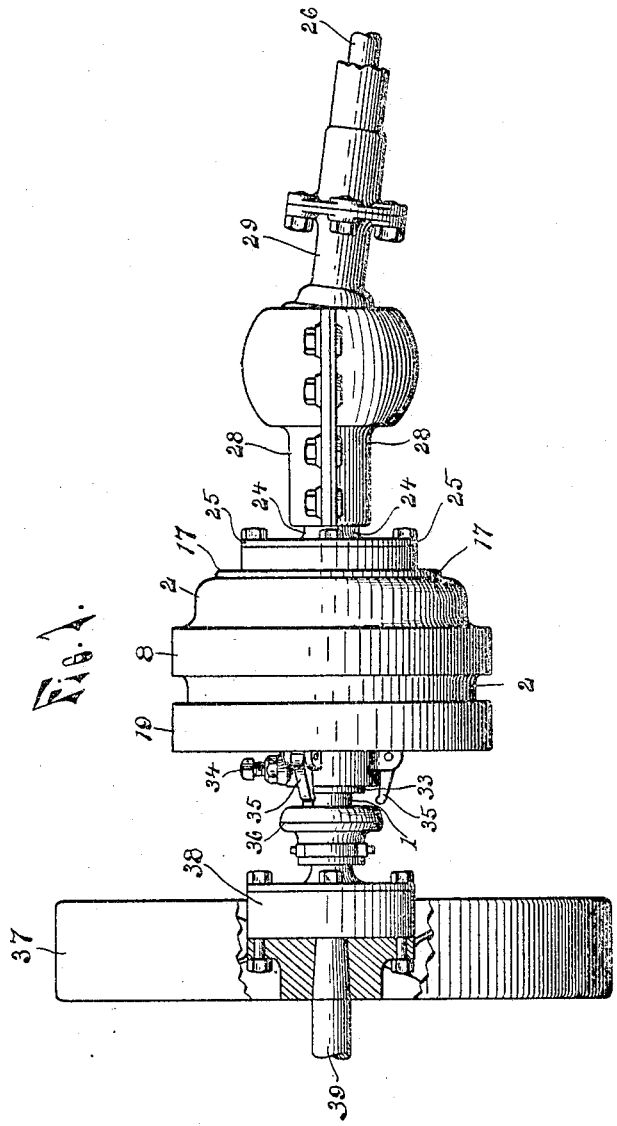
Figure 2:
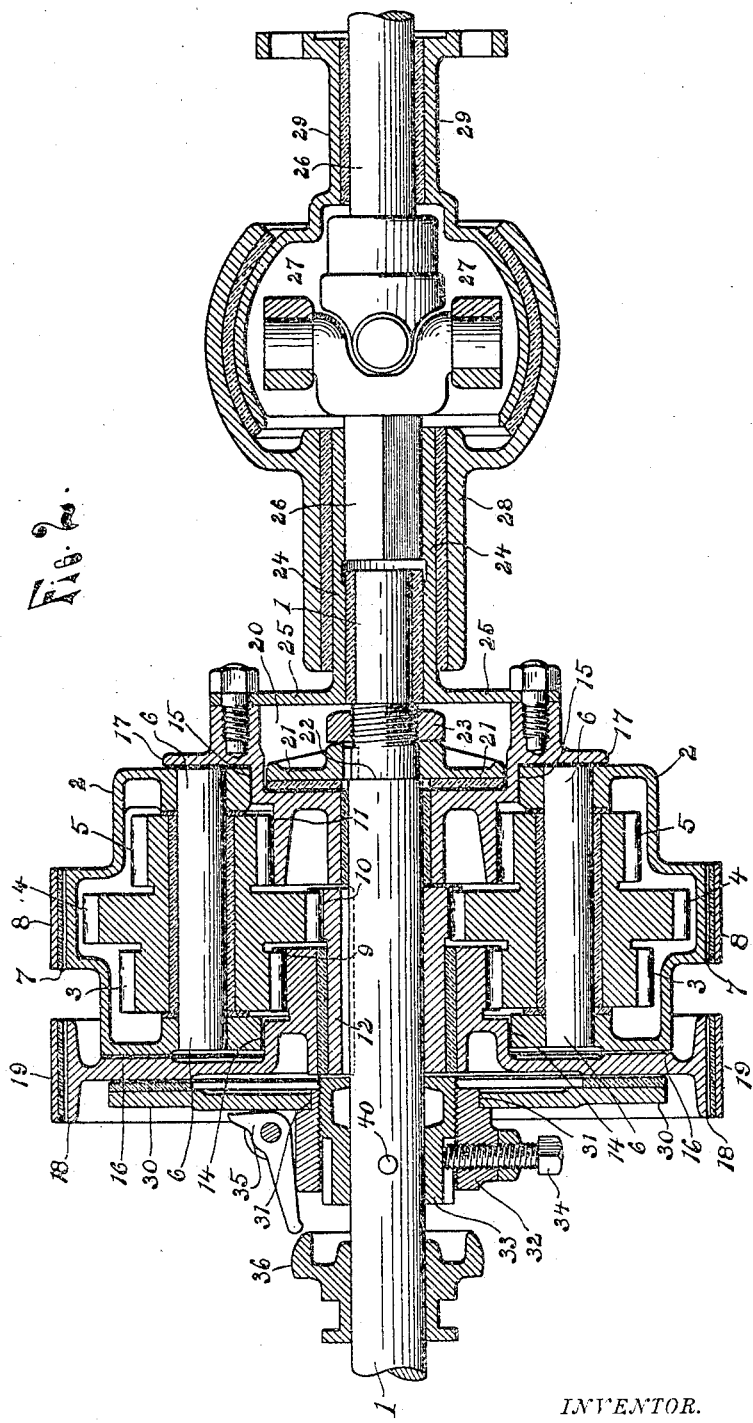

Figure 1 is a side elevation partly in section. Fig. 2 is a central section. Figs. 3, 4, 5, and 6 are detached sections of the parts as indicated by the numerals of reference. Fig. 7 is a detached elevation of the actuating part of the clutch mechanism, partly in section; and Fig. 8 is a side elevation of Fig. 7.

1 represents the driving-shaft.

2 is a hollow brake-drum adapted to rotate about the shaft and carrying two sets of three externally-toothed spur-gears 3, 4, and 5, each set mounted upon a shaft 6, whereby said spur-gears are adapted to turn together on their own axis, as well as move planetarily around the driving-shaft when the drum is rotating. The face of the drum is formed with a brake-wheel 7, with which the brake-strap 8 is adapted to engage and hold the drum from rotating.

9, 10, and 11 are three externally-toothed spur-gears housed within the drum and meshing with the spur-gears 3, 4, and 5, respectively. The spur-gear 10 is keyed upon the driving-shaft and forms the primary driving-gear. The spur-gear 9 is sleeved upon a hub 12 of the primary drive-gear and forms the secondary driving-gear, and the spur-gear 11 is sleeved upon the driving-shaft and forms the driven gear.

The secondary driving-gear 9 and the driven gear 11 are formed at their outer ends with offsets 14 and 15, respectively, which form the journal-bearings upon which the drum rotates, and they are also formed with clamping-flanges 16 and 17, respectively, which are adapted to bear against the opposite sides of the drum and clamp the same between them. The clamping-flange 16 is formed at its rim portion into a brake-wheel 18, upon which the brake-strap 19 is adapted to engage to hold the secondary driving-gear from rotating.

The clamping-flange 17 of the driven gear 11 is formed with a central recess 20 upon its outer face, and within this recess a leather-faced clamping-disk 21 is removably secured upon the driving-shaft, preferably as shown, by forming a shoulder 22 on the shaft and securing the clamping-disk against the shoulder by a nut 23, a key being used to hold the clamping-disk from rotating on the shaft. The clamping-disk 21 is completely housed within the recess by a sleeve 24 upon the driving-shaft, which sleeve has an enlarged flange 25 detachably bolted to the clamping-plate and covers the recess. The sleeve 24 forms the driven sleeve and may carry any suitable power-transmitting means. As shown in the drawings, the sleeve extends some distance beyond the end of the driving-shaft, and this extended portion forms a square socket, into which the end of the driven shaft 26 loosely engages. This shaft is made in two parts, connected by a universal joint 27 to permit of transmitting the power in any desired direction, and to provide a complete housing for this transmitting-shaft a bearing 28 is provided, which has a spherical enlargement concentrically inclosing the universal joint and forms a ball-and-socket connection with the adjacent section of an inclosing jacket 29 for the transmitting-shaft.

The brake-drum 2 as well as the gears 9 and 11 are rotatable independently of each other. They are laterally slidable and can be firmly held together and against independent rotation by being clamped together between the fixed clamping-disk 21 and a leather-faced clamping-disk 30. This disk is laterally slidably supported upon a shoulder 31 on the inner end of a collar 32, which is adjustably secured upon a collar 33, fixed upon the driving-shaft by a pin 40 or otherwise. The adjusting-collar 32 is screw-threaded upon the collar 33, and the latter is provided upon its periphery with longitudinal grooves for a set-screw 34 to engage into to hold the collar 31 in its adjusted position. The shoulder 31 on the collar 32 is a triangle or other suitable polygonal form, and the aperture in the clamping-disk 30 is of corresponding shape, thereby holding the clamping-disk from rotating independently. The collar 32 carries a number of clamping-dogs 35, adapted to be actuated by a cone-collar 36, sliding on the shaft 1 and carried by the forked end of a lever (not shown) under control of the operator, all in the well-known manner.

The driving-shaft 1 is in horizontal alinement with the motor-shaft 39 and is detachably secured to the hub of the balance-wheel 37 of the motor, a distance-piece 38 being preferably interposed between, whereby in detaching the driving-shaft from the balance-wheel and removing the distance-piece the whole transmission proper can be removed without disturbing any other part of the gear except taking off the cap-piece of the bearing 28.

The parts being constructed and arranged as described, they are intended to operate as follows: First, in the condition of the parts as shown in Fig. 2 the driving-shaft will rotate without transmitting power to the driven shaft; second, if the cone-sleeve 36 is thrown into action the clamping-disk 30, clamping-flange 16, drum 2, clamping-flange 17, and clamping-disk 21 will be clamped together and rotate with the shaft 1, and thus transmit power to the driven shaft at the same speed and in the same direction; third, if the band-brake strap 19 is applied power will be transmitted to the driven shaft at a slower speed and in the reverse direction, and, fourth, if the brake-strap 8 is applied power will be transmitted to the driven shaft in the same direction, but at a slower speed.

One of the principal advantages of my construction is that in order to transmit power at full speed ahead it requires the frictional engagement of the five members 30, 16, 2, 17, and 21, which transmits the power by a gradually-increasing turning effort between the different surfaces without throwing any injurious stress upon the machinery or requiring any extra demand on the source of power. Since the transmitting power of the clutch depends upon the degree of frictional adhesion between the clamping-disk 21 and clamping-flange 17, inasmuch as these two members have less frictional surface between them than all the other members, it will be understood that the complete housing of the disk 21, and thus guarding it against all effects of moisture, dust, &c., tending to influence the power of the clutch, is an important advantage and accomplishes in a simple way all the advantages incident to housing the whole transmission-gear. My construction also affords great facility for assembling the parts and mounting and dismounting it. For instance, there is no necessity for taking the brake-drum apart, since the gears 9, 10, and 11 and 3, 4, and 5 may be all withdrawn through the openings in the side of the drum. The drum may thus be cast in one piece, and there will be no trouble from oil leaking out.

Although I have omitted all reference to the running-gear of the automobile, it will be readily understood that my invention in its specific form is designed for a so-called "bevel-gear drive," in which the power is transmitted through the driven shaft to the rear axle by means of bevel-gears in the well-known manner.

Having thus fully described my invention, what I claim is—

1. The combination with a driving-shaft, of a primary driving-gear fast upon the shaft, a secondary driving-gear and a driven gear loose upon the shaft and each provided with a clamping member, a brake-drum between said clamping members and adapted to rotate independently thereof and of the shaft, planetary gears carried by the brake-drum and meshing with the driving and driven gears and means for actuating the clamping members to clamp the drum fast between them.

2. The combination with a driving-shaft, of a primary driving-gear fast upon the shaft, a secondary driving-gear and a driven gear loose upon the shaft and each provided with flanges, a brake-drum interposed between said flanges and supported thereon free to rotate independently thereof and of the shaft, the flanges being adapted to form clamping members, a set of planetary gears carried by the drum and meshing with the driving and driven gears and means for actuating the clamping members to clamp the drum fast between them.

3. The combination with the driving-shaft and driven sleeve, of a primary driving-gear fast on the shaft, a secondary driving-gear and a driven gear sleeved upon the shaft and laterally slidable thereon, a brake-drum concentrically inclosing said driving and driven gears, a set of planetary gears carried by the drum and meshing with the driving and driven gears, the secondary driving-gear and the driven gear being provided with flanges adapted to frictionally engage the sides of the drum and with offsets projecting into openings in the sides of the drum and supporting the same in position between the clamping-flanges free to rotate or to be clamped between the same and means for actuating the clamping-flanges to clamp the drum between them.

4. The combination with the driving-shaft and driven sleeve, of a primary driving-gear fast upon the shaft, a secondary driving-gear and a driven gear sleeved upon the shaft and laterally slidable thereon, a brake-drum concentrically inclosing said driving and driven gears, planetary gears carried by the brake-drum and meshing with the driving and driven gears, the secondary driving-gear and the driven gear provided with clamping-flanges adapted to support the drum between them free to rotate or to clamp the same fast between them, two clamping-disks carried by the driving-shaft and forming with said clamping-flanges and drum members of a friction-clutch, and means for actuating said clutch.

5. The combination with the driving-shaft and a driven sleeve, of a primary driving-gear fast on the shaft, a secondary driving-gear and a driven gear rotatable and laterally slidable on the shaft, a brake-drum concentrically inclosing the driving and driven gears, a planetary set of gears carried by the drum and meshing with the driving and driven gears, the secondary driving-gear and driven gear provided with clamping-flanges adapted to clamp the drum between them and with bearings upon which the drum is journaled, a laterally-slidable clamping-disk adapted to frictionally engage upon the outer face of the clamping-flange of the secondary driving-gear, means for actuating the same into engagement therewith and a fixed clamping-disk on the shaft adapted to frictionally engage with the outer face of the clamping-flange on the driven gear.

6. The combination with the driving-shaft and driven sleeve, of a primary driving-gear fast upon the shaft, a secondary driving-gear and a driven gear loose upon the shaft and laterally slidable thereon, a rotary brake-drum concentrically inclosing said driving and driven gears, planetary gears carried by the brake-drum and meshing with the aforesaid gears, the secondary driving-gear and the driven gear provided with flanges adapted to clamp the drum fast between them and with bearings supporting the drum, a clamping-disk laterally slidably carried by the shaft and provided with means for actuating it into frictional engagement with the outer face of the clamping-disk of the secondary driving-gear, and a fixed clamping-disk upon the shaft adapted to frictionally engage with the outer face of the clamping-flange of the driven gear, said clamping-flange being recessed and forming a housing for the fixed clamping-disk.

7. The combination with the driving-shaft, of a primary driving-gear thereon, a secondary driving-gear and a driven gear laterally slidable upon the shaft and provided with clamping-flanges, a rotary brake-drum interposed between said clamping-flanges, planetary gears carried by said brake-drum and meshing with the driving and driven gears, a laterally-slidable clamping-disk adapted to frictionally engage with the outer face of the clamping-flange of the secondary driving-gear, means for actuating the same, a fixed clamping-disk upon the shaft adapted to frictionally engage with the outer face of the clamping-flange of the driven gear, and a driven sleeve secured to said driven clamping-flange and forming in connection therewith an inclosed housing for the fixed clamping-disk.

8. The combination with the driving-shaft, of a primary driving-gear thereon, a secondary driving-gear and a driven gear laterally slidable upon the shaft and provided with clamping-flanges, a rotary brake-drum interposed between said clamping-flanges, planetary gears carried by said brake-drum and intermeshing with the driving and driven gears, a laterally-sliding clamping-disk adapted to frictionally engage with the outer face of the clamping-flange of the secondary driving-gear, means for actuating said clamping-disk, a clamping-disk fixed upon the shaft and adapted to frictionally engage with the outer face of the clamping-flange of the driven gear, a driven sleeve secured upon said outer face, and brake devices for holding either the brake-drum or the secondary driving-gear from rotating.

9. The combination with the balance-wheel of the motor, of a detachable distance-piece carried on the hub of the wheel, a driving-shaft detachably secured to said distance-piece axially with the balance-wheel, and a power-transmitting device upon the drive-shaft terminating in a driven sleeve extending beyond the end of the drive-shaft and provided with a socket for detachably receiving a driven shaft and transmitting motion thereto.

10. The combination with the motor, of a drive-shaft at the end of the motor-shaft and continuously revolving therewith; a power-transmitting device upon the drive-shaft of the planetary type having a driven member loose upon the drive-shaft and controlling means operating wholly through friction, said driven member adapted to be revolved at the same speed with the drive-shaft or at a slower speed in either direction, a sleeve carried by the driven member and projecting beyond the end of the drive-shaft, a driven shaft having a portion thereof adjacent to the end of the drive-shaft socketed in said sleeve, a bearing in which said sleeve is supported, and a universal joint in the drive-shaft adjacent to its socketed portion.

11. The combination with the balance-wheel of the motor, of a driving-shaft detachably secured to the hub of said wheel in axial alinement therewith, a power-transmitting device upon said shaft terminating at the end of the shaft in a driven sleeve and adapted to transmit motion thereto from the shaft at the same speed as that of the driving-shaft or at a slower speed in either direction, said driven sleeve having a portion extending beyond the end of the driving-shaft, a driven shaft detachably engaging into said extended portion of the driven sleeve and adapted to rotate therewith, a universal joint in said driven shaft adjacent to the end of the driven sleeve, a bearing in which the drive-sleeve is journaled, a bearing for the driving-shaft adjacent to the universal joint and a ball-and-socket connection between said bearings concentrically inclosing the universal joint.

12. The combination with the drive-shaft, of a closed brake-drum the sides of which form friction-disks and have openings therein, planetary gears inclosed within said drum, spur-wheels upon the driving-shaft within the drum and meshing with the planetary gears, the spur-wheels adjacent to the sides of the drum provided with clamping members adapted to frictionally engage the sides of the drum and with offsets projecting into the openings therein and forming bearings for the drum to revolve upon, said openings being of a size to permit the introduction and removal of the parts inclosed within the drum, and means to actuate the clamping-flanges into frictional contact with the sides of the drum.

13. The combination with the drive-shaft, of a brake-drum the sides of which form friction-disks and have openings therein, planetary gears carried within said brake-drum, spur-wheels upon the drive-shaft within the drum and meshing with the planetary gears—the spur-wheels adjacent to the sides of the drum being loose upon the drive-shaft and provided with clamping members adapted to frictionally engage the sides of the drum and with offsets projecting into the openings therein, friction-brakes for one of said clamping members and for the brake-drum, a drive connection between the other clamping member and a driven shaft, and means for actuating the clamping members to clamp the drum fast between them.

14. The combination with the motor, of a drive-shaft rigidly connected with the shaft of the motor and continuously revolving with it, a power-transmitting device upon said shaft of the planetary type having a driven member loose upon the drive-shaft and controlling devices operating wholly through friction said driven member adapted to be revolved at the same speed with the shaft or at a slower speed in either direction, a sleeve carried by said driven member and projecting beyond the end of the drive-shaft and a driven shaft at the end of the drive-shaft having a portion thereof adjacent to the drive-shaft socketed in the end of the sleeve in rigid alinement with the drive-shaft and in continuous operative engagement with the sleeve.

In testimony whereof I affix my signature in presence of two witnesses.

HENRY FORD.

Witnesses:
 LEWIS E. FLANDERS,
 OTTO F. BARTHEL.